United States Patent [19]
Koch et al.

[11] Patent Number: 5,293,688
[45] Date of Patent: Mar. 15, 1994

[54] SHIM THRUST BEARING SYSTEM

[75] Inventors: Hans W. Koch; Bobby L. Hodge, both of Charlotte, N.C.

[73] Assignee: INA Bearing Company, Inc., Fort Mill, S.C.

[21] Appl. No.: 822,753

[22] Filed: Jan. 21, 1992

Related U.S. Application Data

[62] Division of Ser. No. 500,193, Mar. 27, 1990, Pat. No. 5,110,223.

[51] Int. Cl.$^5$ .............................................. F16C 43/00
[52] U.S. Cl. ........................... 29/898.041; 29/898.07; 29/898.09; 29/898.15
[58] Field of Search ............... 29/898.041, 898.07, 29/898.09, 898.15, 893.1, 893.2; 384/620, 621, 622, 623, 624, 625, 626, 537

[56] References Cited

U.S. PATENT DOCUMENTS

| | | | |
|---|---|---|---|
| 3,715,013 | 2/1973 | Lyth et al. | 184/7.4 |
| 3,934,956 | 1/1976 | Pitner | 308/174 |
| 4,310,205 | 1/1982 | Condon | 308/135 |
| 4,606,120 | 8/1986 | McAndrew | 29/837 |
| 4,684,150 | 8/1987 | Specktor et al. | 384/626 X |
| 4,725,153 | 2/1988 | Tsuruki | 384/620 |
| 4,733,979 | 3/1988 | Tsuruki | 384/620 |
| 4,833,857 | 5/1989 | Wheeler | 52/687 |
| 4,883,374 | 11/1989 | Rhoads et al. | 384/618 |
| 4,934,842 | 6/1990 | Premiski et al. | 384/606 |
| 5,098,117 | 3/1992 | Specktor et al. | 384/626 X |

FOREIGN PATENT DOCUMENTS 3914175 11/1989 Fed. Rep. of Germany.
2071228 9/1981 United Kingdom.

*Primary Examiner*—Mark Rosenbaum
*Assistant Examiner*—S. Thomas Hughes
*Attorney, Agent, or Firm*—Wigman, Cohen, Leitner & Myers

[57] ABSTRACT

The present invention comprises a spacer, especially a spacer for use with a thrust roller bearing assembly. An internal radial lip projecting into the central aperture of the spacer provides for frictional retention on a shaft passing therethrough. Where the thrust bearing and spacer combination is to be installed in a bore, one or more external radial lips may be included to frictionally retain the spacer within the bore. The spacer element is adapted for coupling to one of the bearing elements. In one embodiment, the bearing and spacer may be bonded together. In another embodiment, the spacer and bearing are joined by mutually engageable circumferential locking surfaces. The spacer is selected from a plurality of spacers of differing axial dimension, each spacer being color coded according to its axial dimension.

6 Claims, 4 Drawing Sheets

SHIM THRUST BEARING SYSTEM

This is a divisional of co-pending application Ser. No. 07/500,193 filed on Mar. 27, 1990, now U.S. Pat. No. 5,110,223.

TECHNICAL FIELD

This invention relates generally to the thrust bearing art, and more particularly to a washer or spacer having projecting lips which facilitates assembly of a thrust bearing on a shaft or within a bore. The spacers, which may be constructed of plastic material, are advantageously color coded according to axial dimension. The spacer may be combined with a thrust bearing assembly to form a system for installing thrust bearings of selectable axial spacings on a shaft.

BACKGROUND OF THE INVENTION

In the power driven transmission arts, and particularly in the automobile transmission arts, multiple helical gears are typically employed. Since each set of gears meshes differently due to variations within its manufacturing tolerances, and since an axial thrust is exerted by rotation of the gears, thrust bearings are required to carry the axial thrust load. Because of the manufacturing tolerances, the axial dimension required of the thrust bearing may vary; considerable variation may result if multiple gears are employed on a single shaft. In the prior art, shims or spacers of varying axial dimension have been used to take up or fill this variable axial dimension.

During assembly, the gears are selected and installed, leaving an axial dimension or space to be filled by the thrust washer and spacer. This space must be carefully measured. A thrust bearing is first selected, and then a spacer of the desired axial dimension must be selected and located from among the available supply of washers. The spacer and thrust bearing combination must preceisely fill the axial dimension. Often, a plurality of spacers are tried and tested until the right spacer or combination of spacers properly fills the available axial space. This is a difficult and time-consuming task requiring patience and careful attention to detail.

In practice, the gear train is assembled in a transmission on a conventional assembly line. For manufacturing convenience, the transmissions are typically carried by overhead suspension conveyors, and at least some of the parts, including the thrust bearing and spacer, are assembled by inserting these lighter weight bearing parts upwardly into the interior of the suspended transmission from which the shaft extends downwardly. Thrust washers and selected spacers are typically assembled and joined by a thick grease-like compound before being inserted upwards into the suspended transmission and onto the shaft. The grease compound is the primary means for securing the combination onto the exposed, downwardly extending shaft during assembly. The sticky, grease-like compound, however, is prone to picking up undesired environmental dirt and contaminants.

U.S. Pat. Nos. 4,725,153 and 4,733,479 to Tsuruki teach the use of variable axial dimension spacers or shims which snap in place on the thrust bearing portion. In some embodiments disclosed in the Tsuruki patents, annular shims having inner or outer dimensions permitting an interference fit ("interference margin") with internal or external flanged portions of the bearing cage are disclosed. The bearing cage flanges are dimpled or deformed so as to reduce the tolerance of the fit to less than zero clearance in order to require forcible mounting of the shim to the bearing assembly. The manufacturing tolerance of such interference-fit piece parts can be difficult and expensive to maintain, leading to undesirable costs or difficulties during assembly Another shim disclosed by Tsuruki includes a series of dimpled peripheral flanges having interference fit dimensions which snap over the bearing periphery. In addition to the previously mentioned problem with interference fit manufacturing tolerances, this alternative shim is formed of a single piece of material having uniform thickness, and thus the dimpled peripheral flange portions are necessarily of the same thickness as the shim. The external diametrical dimensions of a thrust bearing/spacer assembly become intolerably large with thicker spacers and are thus limited, for practical purposes, to thin shims.

In addition, difficulties in marking the axial dimension on prior art spacers while maintaining the dimensional tolerance thereof present unwieldy sorting problems for assembly line workers.

SUMMARY OF THE INVENTION

It is, therefore, a primary object of the present invention to permit installation of thrust bearings on downwardly extending shafts without the use of sticky grease-like compounds. Another object of this invention is to improve and facilitate the manner in which variations in the axial space on transmission shafts may be taken up or filled during assembly of gear trains thereon.

These and other objects may be accomplished according to the present invention by providing a spacer having one surface which may be assembled in coupling contact with the thrust bearing. An important advantage of the present invention includes the provision of at least one inwardly extending protrusion formed on the spacer which is adapted for gripping the shaft onto which the thrust bearing and spacer assembly is installed. This inwardly extending protrusion may be a lip, bump or other configuration providing a substantial unidirectional low friction fit onto the shaft. The lip may be angled to improve retention on the shaft which eliminates the need for the sticky grease-like compound used in conventional methods of installation.

In one variation, the spacer may be adapted for gripping the interior walls of a cavity or bore by providing one or more outwardly extending protrusions formed on the spacer which are adapted for gripping the cavity walls. Again, the lip may be angled to improve retention.

In one aspect of the invention, the spacers may be color coded according to axial dimension, enabling rapid selection of an appropriate spacer to suit a desired axial dimension of the overall assembly. Color coding by size also permits instant sorting.

Rapid, simple assembly of the bearing and washer combination in a clean bearing plant environment is one advantage of the present invention. In another aspect of the present invention there is provided a thrust bearing and spacer system of assembly in which the bearing and spacer may be preassembled quickly, easily, cheaply, and without special tools. The bearing assembly and spacer may be simply bonded together, or alternatively, attachment of the selected spacer and bearing may be accomplished merely by coaxial alignment of the elements and relative rotation therebetween. By this method, the elements of the present invention are more securely, yet removably, coupled to one another.

The selected spacer is positioned coaxial with the bearing assembly and simply joined thereto. In one variation, the spacer includes at least one circumferential engagement surface mated to a circumferential mutually engageable surface of the mating bearing washer; the two are rotated relative to one another such that the circumferential surfaces mate and lock. The spacer engagement surfaces may include arcuate radial lip extensions which may be tapered along their respective arcs to facilitate the mating and locking thereof with the washer lip engaging portions. Such cooperating taper lock fitting accommodates wide variations in manufacturing tolerances of the cooperating mating surfaces. The spacer and the washer may also be bonded to one another by conventional methods.

Another advantage of the invention, which facilitates assembly, is that the inner and/or outer diameters of the washers and of the spacer may include one or more recesses (which, if plural, may be equidistantly spaced) of particular size for mutual alignment of the elements in a coaxial relationship. Appropriate spanner-type wrenches cooperating with such recesses permit tightening of the parts for locking purposes. Such tightening may also be accomplished robotically.

BRIEF DESCRIPTION OF THE DRAWING FIGURES

Numerous features of the invention disclosed herein will be apparent upon examination of the several drawing figures forming a part hereof. In all views, like reference characters indicate corresponding parts:

DETAILED DESCRIPTION OF THE PREFERRED EMBODIMENTS

Figure 1:
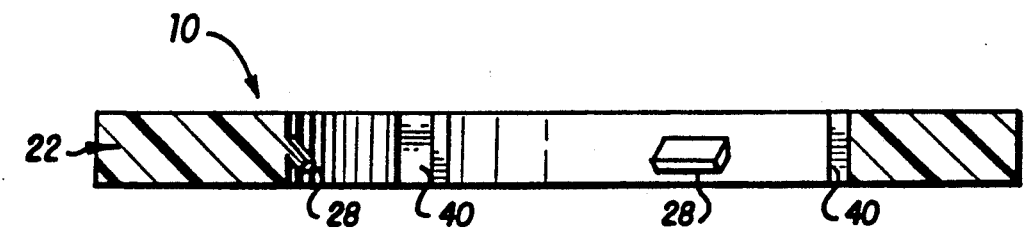
FIG. 1 is a section view of an internal grip spacer according to the present invention.
Figure 2:
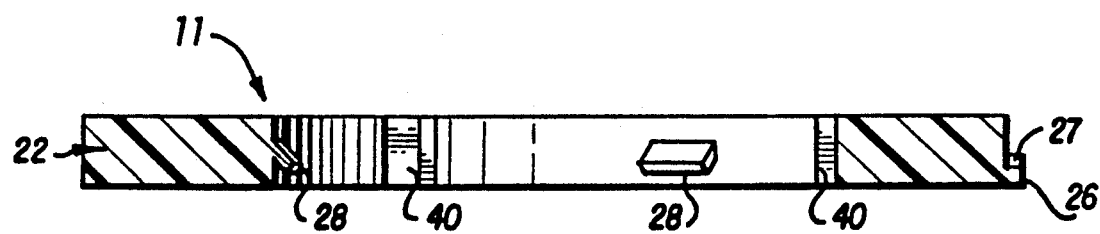
FIG. 2 is a section view of an alternate spacer according to this invention.
Figure 4:
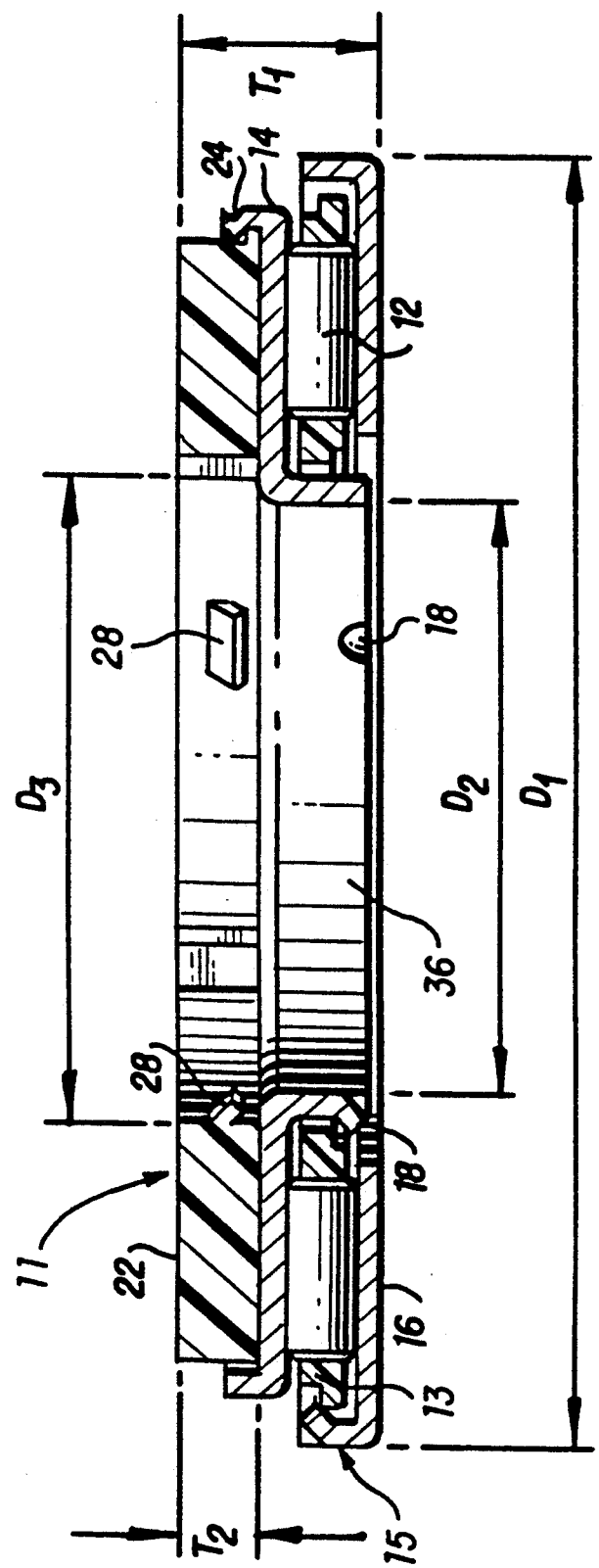
FIG. 4 is a cross sectional view of a thrust bearing and internal grip spacer assembly.

Spacers 10, 11 according to the present invention are shown in FIGS. 1 and 2. The spacers 10, 11 comprise a disk 22 having an axial dimension $T_2$ (FIG. 4) and a central aperture $D_3$ formed with one or more inwardly extending lips 28. The lips 28 are provided to grip a shaft (not shown) extending through the central aperture of the spacers 10, 11. Shown in the preferred embodiment as partially arcuate lip extensions, the lip 28 may be a continuous inner circumferential ring or lip, a plurality of bumps, or other protrusions providing a low friction sliding fit in a first, installation direction and relatively more difficult removal in the opposite direction. The lips 28 may be angled to improve retention on the shaft. Alternatively, a thin lip 28 which is continuous around the inner circumference of the disk 22 central aperture $D_3$ may be employed in which the lip inner diameter is less than the shaft diameter. If the lip or lips 28 are discontinuous around the inner circumference, care should be exercised in designing them to avoid undesirable radial deflection or distortion of the spacer itself when installed on the shaft.

The spacer 10 may be coupled to a thrust bearing or washer to provide additional axial length to the thrust bearing. The spacer 10 may be simply bonded to the thrust bearing to provide the desired additional axial length. Any of the known bonding techniques and materials may be used provided suitable care is made in the selection for the use intended.

In one embodiment of the invention, the spacer 11 (FIG. 2) is adapted for arcuate coupling to a thrust bearing or washer 15 (FIG. 4) by circumferential mutually engageable surfaces. The spacer 11 includes a plurality of peripheral, radially outwardly projecting arcuate spacer lips 26 for interlocking with a bearing assembly. The lips 26 include a taper or incline 27 along the arcuate length thereof This tapered section of the arcuate path facilitates the locking of the spacer 11 to a bearing shell 14, described hereinafter. The taper 27 permits a wide range of normal manufacturing tolerances in manufacture of the spacer 11 and/or the bearing shell 14. The specific configuration of the interlocks shown is for example only, in order to more clearly illustrate this aspect of the present invention.

The thrust bearing 15 in combination with the spacer 11 has an axial dimension $T_1$, an outer diameter $D_1$ and an inner diameter $D_2$, and includes the bearing elements 12 (retained by the bearing cage assembly 13) and at least one bearing shell 14. The inner diameter $D_2$ of the thrust bearing is determined by the diameter of the shaft (not shown) on which it is to be guided or piloted. No special lips, grooves, or other seating arrangements are required in either of the loading members where the spacer/bearing combination is to be installed. Similarly, axial dimension $T_1$ is a dimension determined by the space available between the loading member and the unloaded member, of which neither are shown in these views as they do not form a part of the present invention.

The first bearing shell 14 is an essentially disk-shaped washer having a first flanged outer portion 34 extending in a first direction and an inner flanged portion 36 extending in the opposite direction. The outer flange 34 includes at least one and preferably three inwardly-directed lips 24. The lips 24 may be formed in the flange 34 of rolled or folded over edge portions of the flange 34, or dimpled edges of flange 34 or the equivalents in order to provide these inwardly-directed lips 24. The inner flange 36 extends in the opposite direction of the outer flange 34. A plurality of outwardly-directed lips 18 are formed in the inner flange 36, and may be formed similar to those of outer flange 34. The bearing shell 14 and the lips 18, 24 serve, respectively, to engage the bearing cage 13 and the spacer 11.

The bearing cage 13 is disk-shaped, with a central aperture and a plurality of bearings 12 disposed therein in apertures provided for the bearing elements as is known in the art. The bearing cage 13 central aperture includes an inner peripheral lip 32 extending from its upper face. Another peripheral lip 30 may extend outwardly from its lower face as will be described hereinafter. The bearing cage 13 restrains the bearings 12 during and after assembly thereof.

The inner lip 32 of the bearing cage 13 engages the flange 36 of the bearing shell via the interlock lips 18. The bearing cage 13 and the flange 36 snap together The selected spacer 11 and the bearing shell 14 are coupled by positioning the spacer 11 coaxially within the bearing shell 14 outer flange 34 and rotating the elements relative one another until the circumferential lips 26 of the spacer 11 engage and lock with the bearing shell 14 lips 24.

It is often desirable to include a second bearing shell 16 with the bearing cage 13, between the bearing cage 13 and the load member (not shown) In this instance, the second bearing shell 16 is disk shaped with an inner diameter and an outer flanged portion 38 having yet another plurality of lips 20 provided around the periphery of flange 38. The lips 20 then engage the radial lip 30 of the bearing cage 13, securing the second bearing shell 16 to the bearing cage 13.

Figure 3:
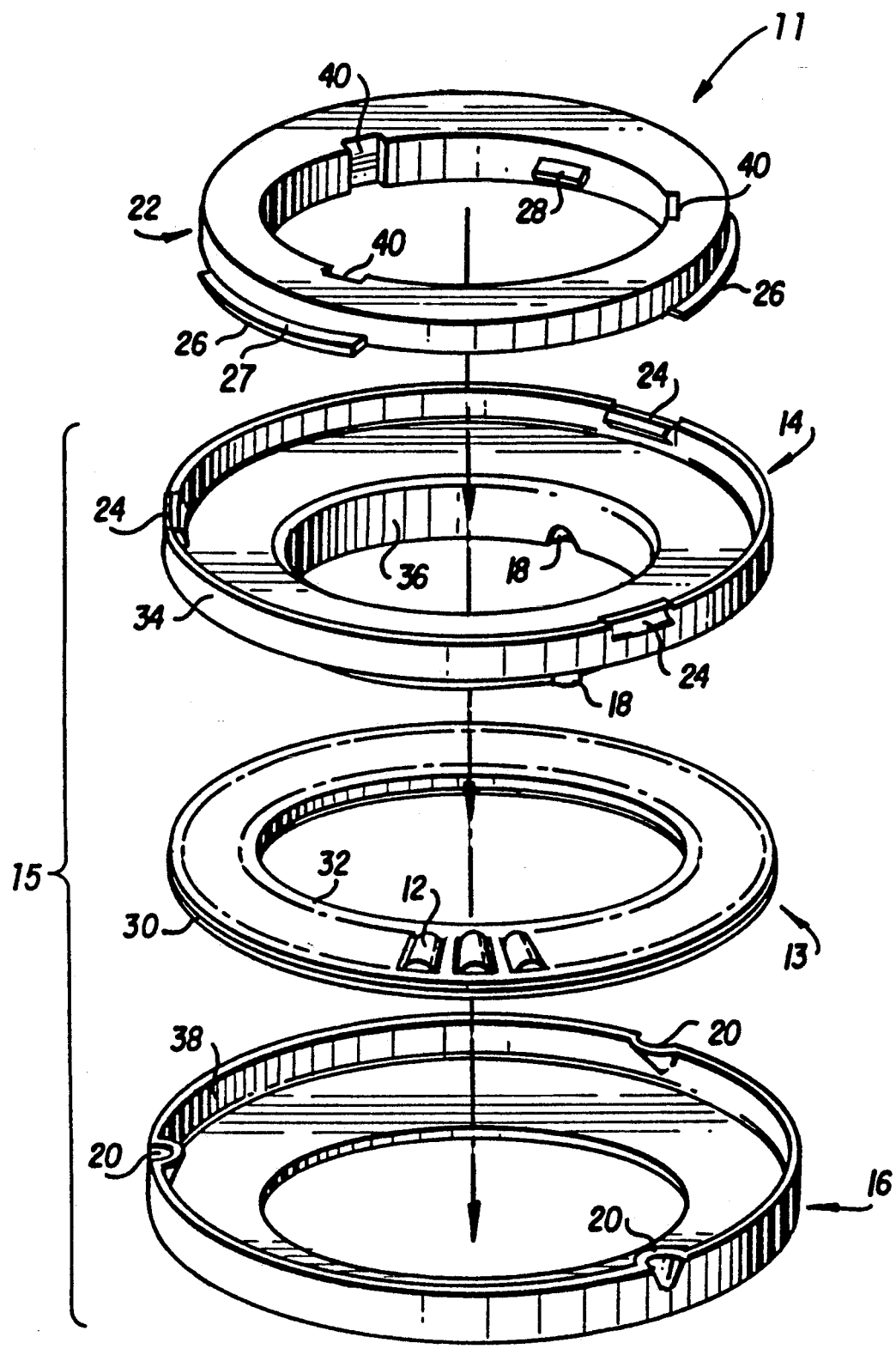
FIG. 3 is an exploded perspective view of a thrust bearing and internal grip spacer assembly.

The exploded perspective view of FIG. 3 also shows first washer 14, second washer 16, second washer 16 interlock 20, 38 with cage 13 assembly and cage assembly interlock 18, 36 with first washer 14 disk 22, first washer 14 interlock 24, 34 with disk 22 interlock 26 with first washer 14, and the internal grip lip 28. A plurality of identical internal diametric alignment and/or wrench recesses 40 are also shown.

Figure 5:
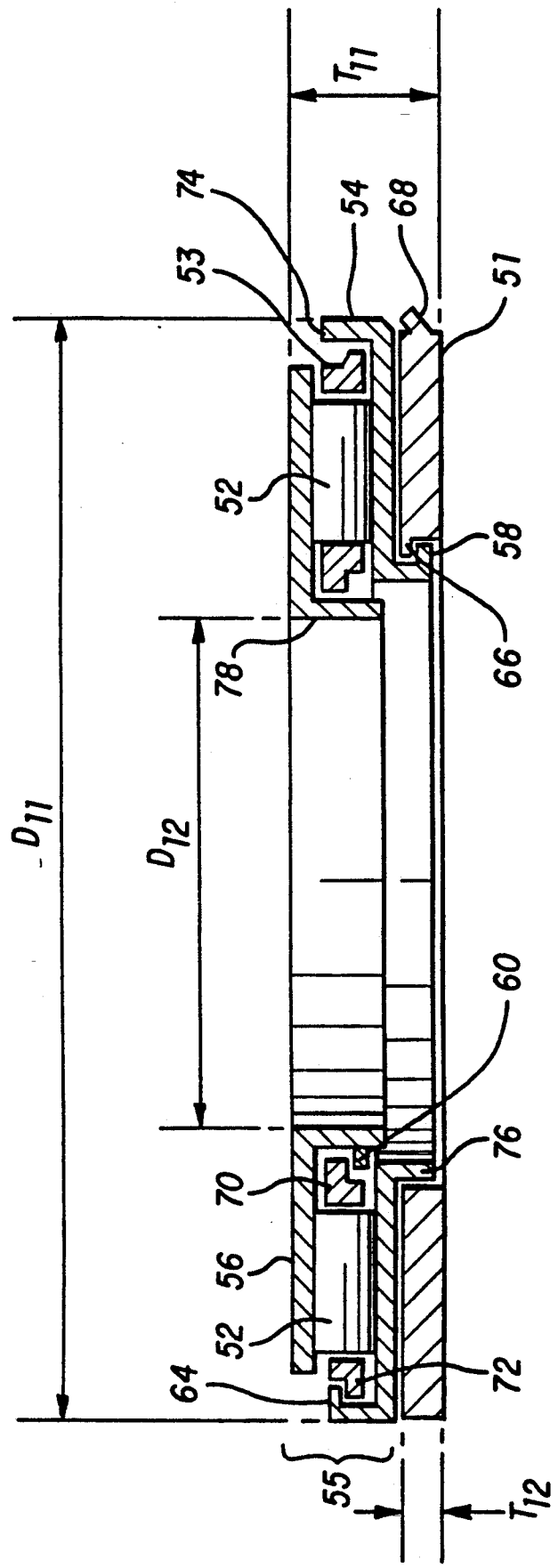
FIG. 5 is a cross sectional view of a thrust bearing and external grip spacer assembly

An alternative grip lip configuration is disclosed in FIG. 5, wherein the spacer includes one or more external grip lips 68. A spacer 51 is joined with a thrust bearing or washer 55 by any of the previously described methods. Here, the spacer 51 is joined to the thrust bearing 55 by a plurality of internal peripheral lips 66 for interlocking with a bearing assembly. The lips 66 may be tapered or inclined, as previously described, to facilitate locking of the spacer to the shell 54 of the bearing 55.

The spacer 51 has an axial dimension $T_{12}$. The thrust bearing 55 has, when combined with spacer 51, an axial dimension $T_{11}$, an inner diameter $D_{12}$ and an outer diameter $D_{11}$, exclusive of the added dimension provided by the external grip lips 68 which may facilitate guiding or piloting the assembly within the bore. Thrust bearing 55 includes bearing elements 52 (retained by the bearing cage assembly 53) and at least one bearing shell 54. The outer diameter $D_{11}$ of the thrust bearing is ordinarily determined by the intended use. The inner diameter $D_{12}$ of the thrust bearing is determined by its intended use. The outer diameter $D_{11}$ is determined by the internal diameter of the cavity or bore into which the bearing 55 and spacer 51 assembly is to be inserted. No special lips, grooves or other seating arrangements are required in the cavity into which the spacer/bearing combination is to be installed. Similarly, axial dimension $T_{11}$ is determined by the space available between the loading member and the unloaded member, neither of which are shown as they do not form a part of the present invention.

The first bearing shell 54 is an essentially disk-shaped washer having a first flanged outer portion 74 extending axially in a first direction and an inner flanged portion 76 extending axially in the opposite direction. The outer flange 74 includes at least one and preferably three inwardly-directed lips 64. The lips 64 may be formed in the flange 74 by rolled or folded-over edge portions of the flange 74, or dimpled edges of flange 74, or the many equivalents known in the art in order to provide these inwardly-directed gripping points. A plurality of similar, outwardly-directed lips 58 serve, to engage the spacer 51 with the inner flange 76.

The bearing cage 53 is disk-shaped, having a central aperture and a plurality of bearings 52 disposed therein in apertures provided for the bearing elements as is known in the art. Bearing cage 53 includes at least one (and preferably 3) lower peripheral lips 72 for joining the cage to bearing shell 64. A second shell 56 is provided when needed. In this instance, the second bearing shell 56 is also disk-shaped and includes an inner flanged portion 78 having yet another plurality of inwardly directed lips 60 provided around the periphery of the flanged portion 78. These lips engage the upper lip 70 of the bearing cage 53, thus securing the first and second shells to the bearing cage 53.

The spacer 10, 11, or 51 may be coupled to a thrust bearing or washer to provide additional axial length to the thrust bearing. The spacer may be simply bonded to the thrust bearing to provide the desired additional axial length. Any of the known bonding techniques and materials may be used provided suitable care is made in the selection for the use intended.

The spacers 10, 11, and 51 may be molded or otherwise formed of a durable material, such as a monomer or polymer plastic, and may use an elastomer insert. Metals and composites may also be used, especially as fill materials.

In another embodiment of the present invention, each of the spacers 10, 11, 51 includes at least one internal diametrical recess 40 which may be of similar size and shape, provided for alignment purposes. The elements may be gripped or grasped at these recesses by a spanner for holding or tightening the respective component. Similar recesses of predetermined shape may also be provided for machine assembly of the components.

In the preferred embodiments of this invention the circumferential mutual engageable surfaces of the thrust bearing and the spacer 11 have been described in terms of a limited number of such surfaces around the periphery of the specific element. More specifically, one variation of this aspect of the invention is directed to three sets of mutually engageable surfaces (24, 26) on each of the bearing race 14 and the spacer 11. Similarly, the spacer 51 and the shell 54 of bearing 55 include similar mutual engagement surfaces. While three mating surfaces have been determined to be a preferable number of such mutual engageable surfaces per set of such surfaces, the scope of the appended claims is intended to include a plurality of at least two such periperhal mating surfaces per set of such surfaces.

Bearing elements 12, 52 are shown as roller bearings; however, various bearing element shapes may be adopted for the design within the intended scope of the claimed invention, including needle bearings, ball bearings, tapered bearings, and roller bearings. Selection of appropriate bearing elements is within the skill of an artisan in this field.

The present invention comprehends that the spacers 10, 11, or 51 are to be grouped according to axial dimension $T_2$ in collections of such spacers 10, 11, or 51 having different axial dimensions. When grouped according to axial dimension, each separate axial dimension spacer may bear a different color or combination of colors in a color coding system for easily distinguishing the spacers according to axial dimension. Since the spacers 10, 11, or 51 may be made of plastic or other moldable materials, the various axial dimension color coding schemes may be molded directly into the spacer. While the spacers may be of any conventional axial dimension, as known to those of ordinary skill in assembling such thrust bearing or washer assemblies, one range of axial dimension values extends from less than 0.1 inches to greater than 0.3 inches. The axial dimension $T_2$ of the spacer 10, 11, or axial dimension $T_{12}$ of spacer 51 can be increased either by selecting thicker spacers, or in yet another variation of the invention, a plurality of spacers may be stacked together for additional thickness.

Assembly of spacer 11 and bearing elements, which may be performed on a shaft (not shown), is readily accomplished. The bearing cage 13 is attached to the first washer 14 and second washer 16, if used. The assembly is completed when a selected axial dimension spacer 11 is positioned coaxial with the first washer 14 and the circumferential engagement surfaces 26 of disk 22 are mated to first washer interlock means; the spacer 11 and washer 14 are rotated relative to one another until the circumferential surfaces mate and lock. In one version of the interlock variation of the invention the spacer 11 interlock portions are radially outward extending arcuate lips 26 having an inclined portion 27 along the arcuate path thereof. The inclined portion 27 of spacer lip 26 cooperates with lips 24 on flanges 34 of first washer 14 to form a tight, taper lock fit, which is releasable by counterrotation, if desired. Spacer 51 and bearing 55 may be similarly configured, preferably with the engagement surfaces located on the interior of the spacer 51 and bearing 55. The angle of the incline is selected to insure smooth assembly and a firm locking action consistent with easy disassembly. Surface irregularities may be provided along the incline to further insure locking.

The invention is not to be limited by the illustrative, preferred embodiments disclosed herein. Numerous further modifications and variations will be apparent to those skilled in the art. Other equivalent circumferential and locking engagement means may be employed; equivalent materials may be substituted; and equivalents of the particular methods of forming parts disclosed may be employed without departing from the spirit and scope of the present invention as claimed in the appended claims.

We claim:

1. A system for installing a thrust bearing coaxially with respect to a mounting member having a segment having an axial dimension where the bearing to be installed and a predetermined radial dimension, wherein said axial dimension varies within an expected range, comprising the steps of:
   a) providing a thrust bearing having a radial dimension and an axial dimension, the axial dimension of said thrust bearing being less than a maximum dimension of said expected range;
   b) providing a plurality of spacers of varying axial dimension, each of said plurality of spacers being color coded to correspond with a predetermined axial dimension within said expected range; and
   c) selecting from said plurality of spacers one spacer of a desired axial dimension;
   whereby a thrust bearing and spacer combination having an overall axial dimension corresponding to the axial dimension of a given mounting member segment may be installed on that mounting member segment, and wherein each of said bearing and said spacer further include radially extending means for locking said spacer and said bearing together in combination;
   d) coaxially assembling said thrust bearing and spacer combination by rotating same relative to one another such that their respective means for locking mate and lock; and
   e) installing said assembled thrust bearing and spacer combination on said mounting segment.

2. The system of claim 1, wherein said one spacer has a radial dimension and includes radially projecting means for frictionally engaging said mounting member, said means for frictionally engaging being radially deflectable such that the radial dimension of said spacer will correspond substantially to the radial dimension of said mounting member when installed with said mounting member, wherein said installing step includes the step of assembling said thrust bearing and spacer in combination on said mounting member such that said means for frictionally engaging engages and grips said mounting member.

3. The system of claim 2, wherein said mounting member is a shaft and said means for frictionally engaging is adapted to grip said shaft, wherein said installing step includes the step of installing said thrust bearing and spacer in combination on said shaft.

4. The system of claim 2, wherein said mounting member is a bore and said spacer means for frictionally engaging is adapted to grip an inner surface of said bore, wherein said installing step includes the step of installing said thrust bearing and spacer in combination in said bore.

5. The system of claim 2, wherein said segment axial dimension includes an axial direction parallel thereto, and wherein said means for frictionally engaging is inclined relative to the axial direction to provide preferential one-way frictional engagement, wherein said installing step includes the step of installing said thrust bearing and spacer in combination to grip said mounting member.

6. A system for assembling a thrust bearing to be installed coaxially with respect to a mounting member having a segment having an axial dimension where the bearing is to be installed and a predetermined radial dimension, wherein said axial dimension varies within an expected range, comprising the steps of:
   a) providing a thrust bearing having a radial dimension and an axial dimension, the axial dimension of said thrust bearing being less than a maximum dimension of said expected range;
   b) providing a plurality of spacers of varying axial dimension, each of said plurality of spacers being color coded to correspond with a predetermined axial dimension within said expected range;
   c) selecting from said plurality of spacers one spacer of a desired axial dimension; whereby a thrust bearing and spacer combination having an overall axial dimension corresponding to the axial dimension of a given mounting member segment may be installed on that mounting member segment, and wherein each of said bearing and said spacer further include radially extending means for locking said spacer and said bearing together in combination,
   d) coaxially assembling said thrust bearing and spacer combination by rotating same relative to one another such that their respective means for locking mate and lock.

* * * * *